July 15, 1952

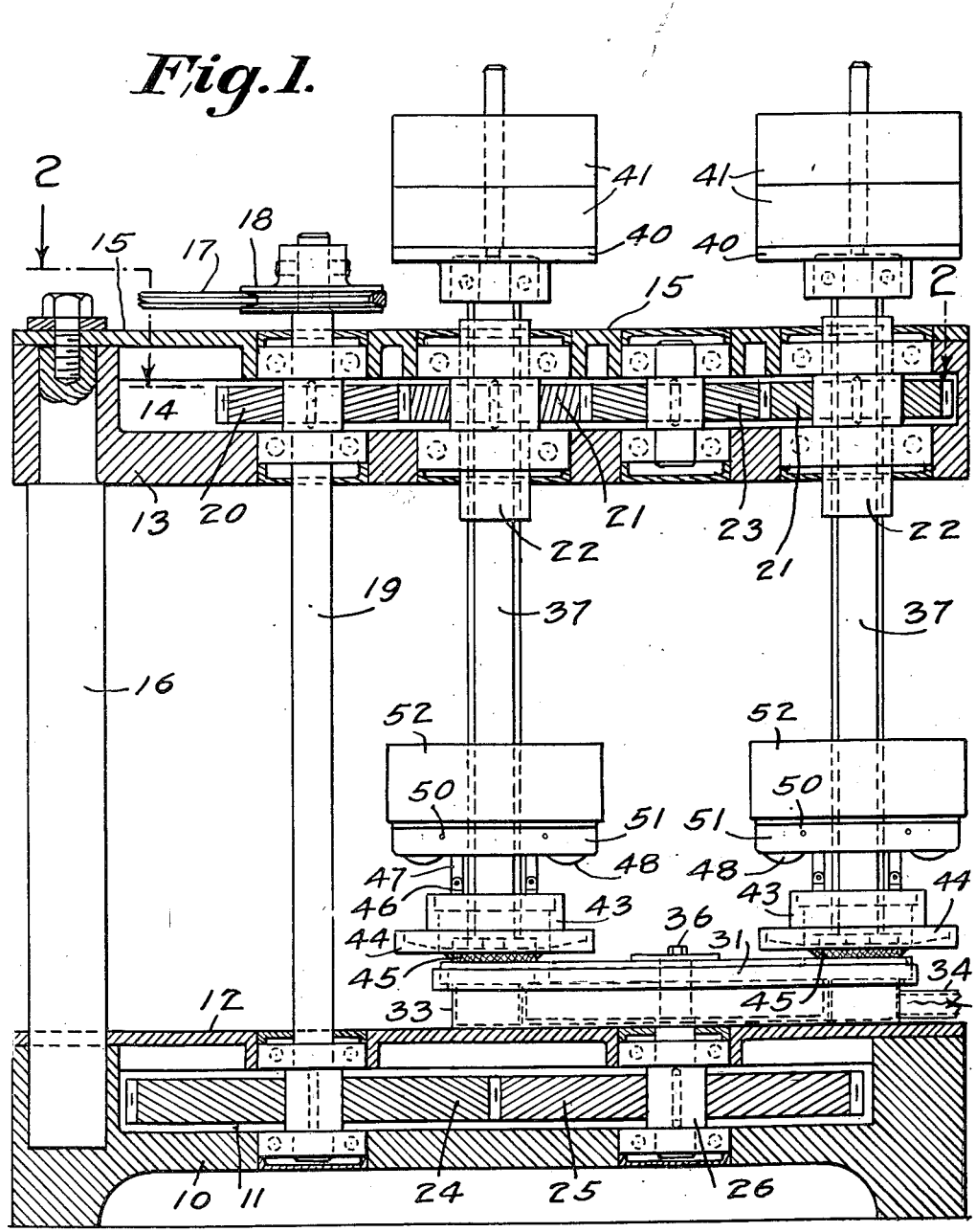

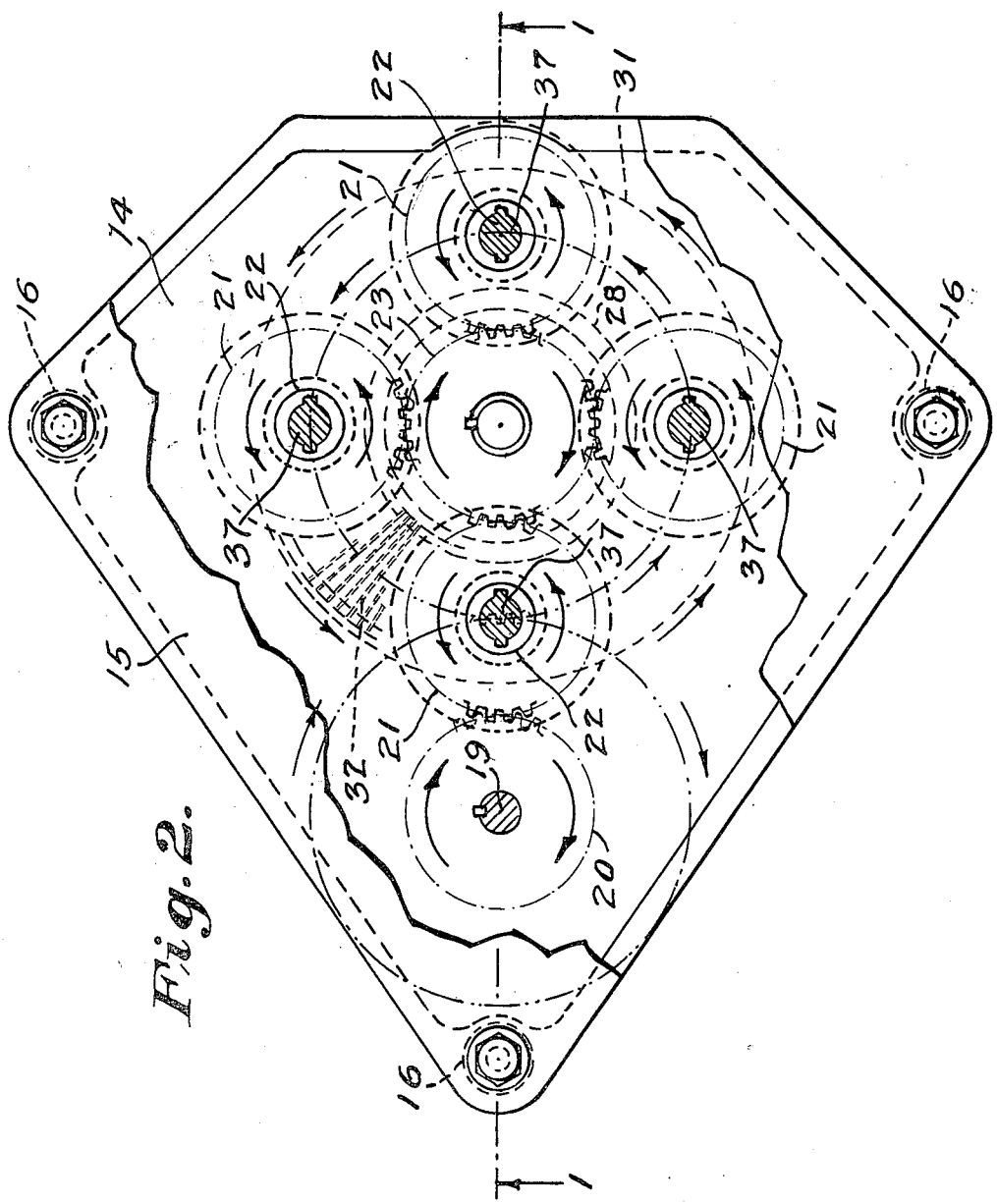

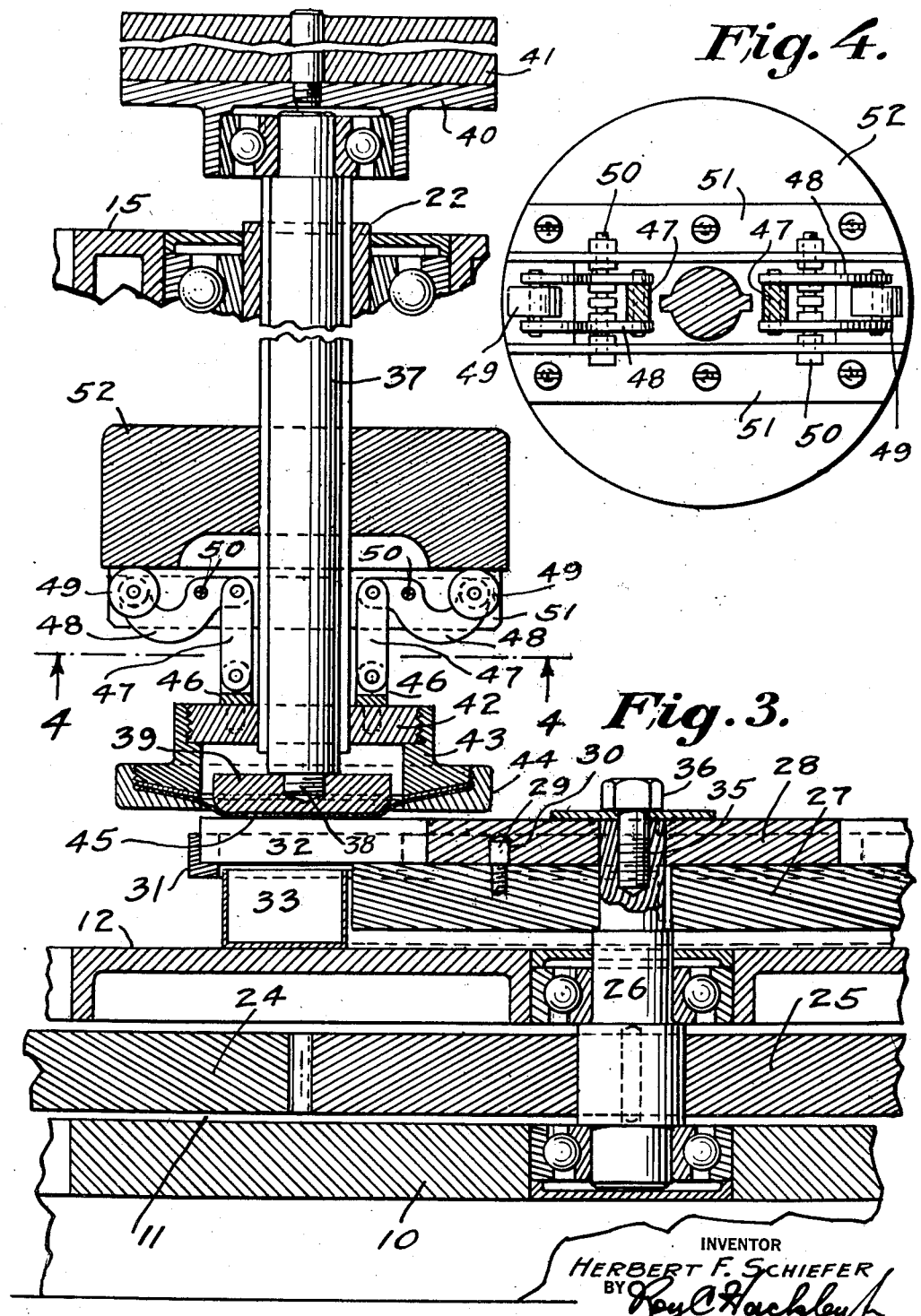

H. F. SCHIEFER 2,603,083

APPARATUS FOR TESTING THE RESISTANCE
OF MATERIALS TO ABRASION

Filed Feb. 19, 1948

INVENTOR
HERBERT F. SCHIEFER
BY
ATTORNEY

Patented July 15, 1952

2,603,083

UNITED STATES PATENT OFFICE 2,603,083

APPARATUS FOR TESTING THE RESISTANCE OF MATERIALS TO ABRASION

Herbert F. Schiefer, Ann Arbor, Mich., assignor to the United States of America as represented by the Secretary of Commerce Application February 19, 1948, Serial No. 61,243

5 Claims. (Cl. 73—7)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to the testing of the abrasion resisting qualities of materials and particularly to the herein disclosed apparatus whereby the resisting quality is uniformly tested in every direction.

In the accompanying drawings of a preferred embodiment of my invention:

Figure 1 is a vertical section on the line 1—1 of Figure 2.

Figure 2 is a plan view, partly broken away and partly in section on the line 2—2 of Figure 1.

Figure 3 is an enlarged vertical section, partly broken away, showing an abradant member and a sample holder.

Figure 4 is a section on the line 4—4 of Figure 3.

In these drawings:

Figure 5:
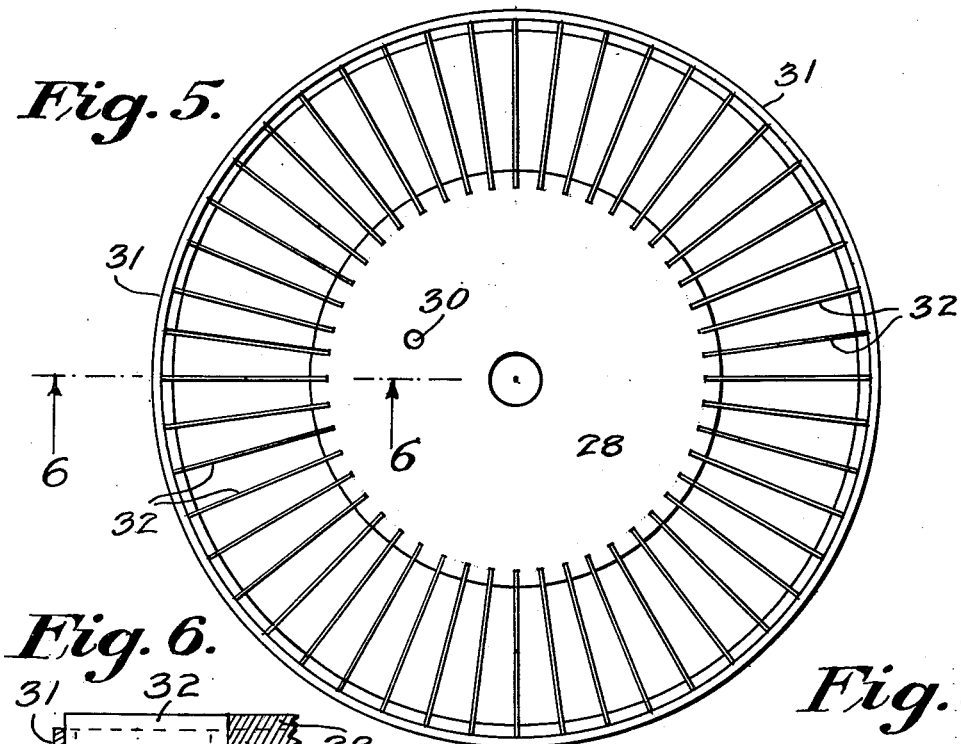
Figure 5 is a detail plan view of one form of my abradant member.

A base plate 10 provided with a recess 11 and a cover plate 12 support an upper plate 13 provided with a recess 14 and a second cover plate 15. The upper plate 13 is supported above the base plate 10 by a plurality of frame posts 16. Power is supplied from a suitable belt 17 which engages a pulley 18 secured to a drive shaft 19. In the recess 14 is a drive gear 20 keyed to the drive shaft 19 which gear in turn meshes with one of a plurality of gears 21, each secured to one of a plurality of sleeves 22. The driven gear 21 also meshes with an idler gear 23 which in turn meshes with the remaining gears 21.

In the recess 11 a gear 24 is keyed to drive shaft 19 and is meshed with a second gear 25 on a stud shaft 26 on which is secured a table 27. The table 27 supports an abradant wheel 28 and is operatively connected thereto by one (or more) pins 29 in a hole 30. An outer ring 31 of the abradant wheel 28 supports a plurality of spaced radial blades 32. Under the blades 32 is an upwardly open exhaust duct 33 which is connected by one or more pipes 34 with a suitable exhaust fan, not shown. The stud shaft 26 terminates in an internally threaded end 35 for a bolt 36 which secures the abradant wheel 28 to the table 27. Within each of the sleeves 22 is an externally splined axially reciprocable shaft 37. The shaft 37 extends downwardly from the upper plate 13 and is terminally threaded at 38 to receive a pressure shoe 39. At the upper end of the shaft 37 is a weight supporting platform 40 for a plurality of removably mounted weights 41. An externally threaded and internally splined collar 42 is slidably mounted on the splined shaft 37, and supports an internally threaded ring 43 which is also externally threaded to secure a sample clamping ring 44 for clamping the fabric or other sample 45 to be tested. The collar 42 is provided with fittings 46 for links 47 each of which is pivotally connected to a lever arm 48, which is provided with a terminal roller 49 and pivotally mounted on a pin 50 which is in turn supported in two bearing angles 51. The bearing angles 51 are secured to the under side of an annular weight 52 which is free to move axially over the splines of the shaft 37 but compelled by the splines to rotate with the shaft 37.

Figure 6:
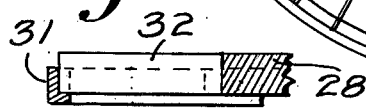
Figure 6 is a fragmentary detail section on the line 6—6 of Figure 5.
Figure 8:
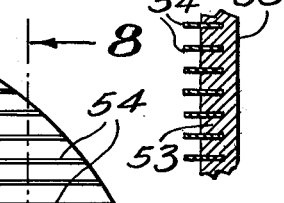
Figure 8 is a fragmentary detail section on the line 8—8 of Figure 7.
Figure 7:
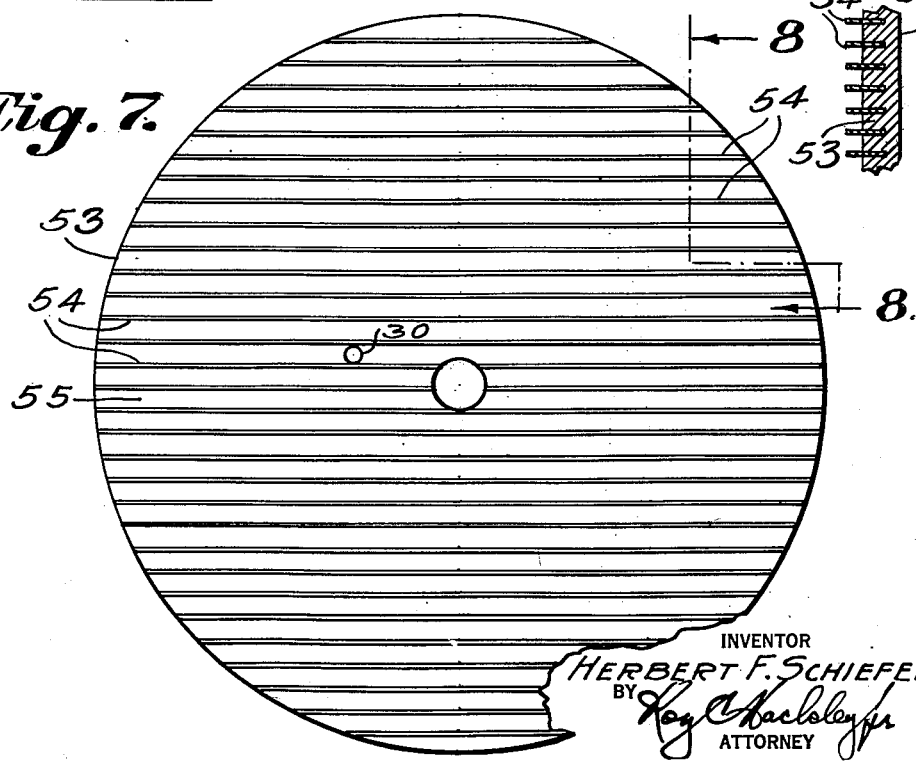
Figure 7 is a detail plan view of a modified form of my abradant member.

Figures 5 and 6 illustrate on a larger scale, my abradant wheel 28, while Figures 7 and 8 illustrate an alternative abradant wheel 53 in which a plurality of parallel blades 54 and a continuous disk 55 are substituted for the radial blades 32, the outer ring 31 and the smaller disk of my abradant wheel 28. Ball bearings are provided for each of the shafts as illustrated in the drawings.

In the operation of my device, see Figure 3, the splined shaft 37 with the pressure shoe 39 and the collar 42 is lifted to and supported in an uppermost position while a circular sample is placed over the ring 43 and clamped in position by the clamping ring 44. The shaft 37 is then released and assumes an operative position as shown in Figure 3 in which the sample is stretched by resilient force and at the same time resiliently pressed against the blades 32. Power is then applied through the belt 17 which rotates both the abradant member and the sample in the same direction but about different axes, and with the same angular velocity, whereby the abradant member so engages the sample that the instantaneous relative velocity between the abradant member and the sample is constant in magnitude and direction for every point of the sample and the instantaneous velocity between the abradant member and the sample in each rotation of the abradant member and sample remains constant in magnitude but changes uniformly and continuously in direction through 360 degrees at each and every point of the sample, while the constant, but adjustable, downward force maintains uniform contact and pressure between the abradant member and the sample and while the constant, but adjustable force maintains the sample under uniform radial tension.

Referring to Figure 2, which is a schematic plan view with parts broken away, it will be observed that there are four sample holders which may simultaneously press samples of four different materials against a single abradant member thereby enabling the user to accurately compare the abrasion resisting qualities of the simultaneously tested samples. If desired, any suitable form of revolution counter or tachometer may also be used for the purpose of comparing the results of tests made at different times.

It should be understood that the present disclosure is for the purpose of illustration only, and that the invention includes all modifications and equivalents which fall within the scope of the appended claims.

What I claim is:

1. In a testing machine for comparing the wear resisting qualities of materials, the combination with a rotatable abradant element, a specimen support rotatable on an axis parallel with that of said element, power operated means for simultaneously rotating said supports in the same direction and with the same angular velocity, and means for resiliently pressing a specimen in said specimen support against said abradant element.

2. A machine for testing the abrasion resisting qualities of materials, comprising an abradant element, a rotatable abradant element support, a specimen support rotatable on an axis parallel to said abradant support, power operated means for rotating said supports in the same direction and with the same angular velocity means for resiliently pressing a specimen against said abradant element and means for resiliently maintaining a specimen under uniform radial tension.

3. A machine for testing the abrasion resisting qualities of materials, comprising an abradant element, a rotatable abradant element support, a plurality of specimen supports rotatable on axes parallel to said abradant support, power operated means for simultaneously rotating said supports in the same direction and with the same angular velocity, means for simultaneously pressing the plurality of specimens in said specimen supports against said abradant element, and means for simultaneously maintaining the plurality of specimens under uniform radial tension.

4. In combination with a machine for testing the abrasion resisting qualities of materials, provided with an abrading element, the improvement which comprises a plurality of specimen supports eccentrically mounted on axes parallel with the axis of rotation of said abrading element, and power operated gearing for simultaneously driving said specimen supports at identical speeds and for changing the direction of movement of each specimen support with respect to said abrading element.

5. In combination with a machine for testing the abrasion resisting qualities of materials, the improvement which comprises a specimen supporting element including a central pressure shoe, yielding means for advancing said shoe, an externally threaded and internally splined collar concentric with said shoe, an internally and externally threaded ring mounted on said threaded collar, and an internally threaded sample clamping ring mounted on said first ring, whereby a sample undergoing a test may be clamped between said collar and said clamping ring and maintained under constant uniform radial tension.

HERBERT F. SCHIEFER.

REFERENCES CITED

The following references are of record in the file of this patent:

UNITED STATES PATENTS

| Number | Name | Date |
| --- | --- | --- |
| 1,667,076 | McGovern | Apr. 24, 1928 |
| 2,251,681 | Hathaway et al. | Aug. 5, 1941 |
| 2,412,221 | Kallas et al. | Dec. 10, 1946 |

FOREIGN PATENTS

| Number | Country | Date |
| --- | --- | --- |
| 296,698 | Germany | Feb. 21, 1917 |